US005711153A

United States Patent [19]

Tetro

[11] Patent Number: 5,711,153

[45] Date of Patent: Jan. 27, 1998

[54] PRECISION HYDRAULIC ADJUSTABLE STOP

[75] Inventor: Richard S. Tetro, Fulton, N.Y.

[73] Assignee: The Black Clawson Company, Middletown, Ohio

[21] Appl. No.: 681,673

[22] Filed: Jul. 29, 1996

[51] Int. Cl.[6] .......... B60T 7/00

[52] U.S. Cl. .......... 60/583; 60/568; 92/103 M

[58] Field of Search .......... 60/583, 568; 92/89, 92/103 M

[56] References Cited

U.S. PATENT DOCUMENTS

| | | | |
|---|---|---|---|
| 1,120,717 | 12/1914 | Hogan | 60/568 |
| 4,495,886 | 1/1985 | Phelps . | |
| 4,860,542 | 8/1989 | Hatayama | 60/583 |
| 5,155,997 | 10/1992 | McGushion | 60/583 |
| 5,201,178 | 4/1993 | Roseman | 60/568 |

FOREIGN PATENT DOCUMENTS

| | | | |
|---|---|---|---|
| 955613 | 1/1950 | France | 60/583 |

*Primary Examiner*—Thomas E. Denion
*Attorney, Agent, or Firm*—Biebel & French

[57] ABSTRACT

Repeatable no-backlash adjustable hydraulic stops are disclosed which have a rigid body which defines a cavity. One or more elastically deformable end plates are mounted in closing relation to the body cavity for enclosing and encapsulating an amount of liquid therein. A plunger in the body is movable in fluid displacing relation to the cavity for providing an accurate elastic displacement of the enclosing end plates which elastic displacement or movement is accurately repeatable by rotating an actuator rod which engages the plunger for varying the fluid displacing relationship to the interior of the cavity. An initial static pressure is formed within the cavity for pre-stressing the components and providing for no-backlash adjustment. Locating pads are formed exteriorly of the flexible walls defining an accurate stop position.

11 Claims, 4 Drawing Sheets

PRECISION HYDRAULIC ADJUSTABLE STOP

BACKGROUND OF THE INVENTION

This invention relates to precision stops, and more particularly to adjustable precision stops which are free of backlash and which are easily adjustable within a range of positions to locate one or more exterior stop surfaces, and which positions are repeatable.

Industrial operations and industrial equipment often require the interposition of stop members, the position or thickness of which may be accurately controlled. As an example, the patent of Phelps U.S. Pat. No. 4,495,886 issued Jan. 29, 1985 shows the employment of stops in the form of replaceable micrometer blocks for the purpose of accurately defining and maintaining a gap between a metering roll and a coating transfer roll in a precision roll coater. In that case, a tolerance of positioning was required within 75 microinches. Another requirement for precision stops is that of maintaining a nip gap in the calendaring of paper.

Commonly, tapered wedges or other mechanical arrangements have been used for the purpose of forming an adjustable stop but they suffer from the fact that their positioning is not accurately repeatable, and the fact that they are not always free of backlash and can be difficult to move under high loading conditions.

SUMMARY OF THE INVENTION

This invention is directed to an improved precision stop member in which a closed or sealed cavity in a rigid body is filled with a relatively incompressible fluid. At least one wall of the cavity is formed by a semi-flexible or deflectable plate that defines, on an outer surface, a precision force locating pad or stop surface.

A fluid displacement member in the form of a piston or plunger is axially moveable in order to displace fluid from this piston/cylinder area to the deflectable wall or plate. A constant volume of the fluid is maintained within the cavity. During initial assembly of this fluid, the cavity and seals provide a predetermined minimum loading pressure thereby applying a predetermined stress to this wall. The position of the plunger is adjustable to adjust the static position of the locating surface on the wall, with respect to the body or with respect to a second located surface on the body.

In a preferred embodiment of the invention, the cavity-defining body is relatively inflexible or rigid, and supports a pair of opposed semi-flexible disc-shaped walls in sealing relation to the internal cavity. The cavity is filled with an incompressible high bulk modulus fluid, such as glycerin (glycerol), although water may also be used. The assembly must be purged of any compressible gas (such as air) during initial assembly.

A plunger has a portion moveable into the cavity to displace a variable quantity of fluid thereby stressing the opposed walls outwardly from each other by a predetermined amount, for accurate positioning or spacing between the respective location surfaces thereon. Varying the fluid displacement within the cavity provides a linear adjustment while resisting large magnitude external force with very small backlash.

It is preferred that the semi-flexible wall or walls be formed of a geometrically uniform pattern, such as a circle, with a generally uniform wall thickness throughout. It is preferred that a stop or force transmitting or locating surface be formed on the exterior surface which is geometrically central to the semi-flexible wall geometry.

The wall thus may be mounted on an annular substantially rigid body defining a cylindrical cavity with opposed wall-receiving surfaces by which a pair of such disc-like walls may be mounted in opposed relation to each other thereby encapsulating the cavity. The walls may be attached to the body by means of a plurality of bolts arranged in a closely spaced circular pattern. Seals are interposed between the respective walls and the body. Such an arrangement provides for a limited range of deflection or movement of the semi-rigid walls, which movement is a linear relation to fluid volumn in the cavity caused by the displacement of the threadably mounted plunger.

The plunger is displaced by rotation of a plunger support on the threads in a bonnet, to displace a volume of fluid within the cavity accompanied by substantially uniform, equal, and repeatable deflections of the semi-flexible walls and the associated locating pads for surfaces formed on the outer surface of these walls.

Due to the fact that a minimum constant and positive pressure is maintained in the interior cavity, all components and seals are stressed in the same direction, and a precise position is maintained without stress reversals. Therefore, backlash is eliminated. A gauge or force transducer may be associated with the cavity for the purpose of assisting in the attainment of an adjusted stop position and to provide a visual or electrical indication of the maintenance of a predetermined pre-load pressure within the cavity, thereby indicating the proper operation of the adjustable stop device.

In another embodiment of the invention, a cavity is formed in a generally cup-shaped rigid body and is closed by a single semi-flexible wall. Such a stop device may be preferred due to its lower cost and due to the fact that all of the fluid displacement results in deflection substantially of one wall only. Such a single-sided stop may be preferred in those instances where the stop defines a travel limit with respect to other movements and where it is desired to mount the stop body rigidly to other components.

A particular advantage of the hydraulic stop device is the fact that, within its range, there is a substantially linear relationship between the extent of movement of the plunger and the position of the stop surface or surfaces. Preferably, the plunger is mounted on threads extending through a valve-type bonnet and is adjustable by simple rotation. The pre-load pressure of the liquid on the plunger assures the take up of backlash at the threads and at the seals. Two or more of the devices may be positioned in tandem to each other to permit stacking.

The adjustable hydraulic stops according to this invention are particularly adapted for automatic control such as by automatic control of the position of the fluid displacement member in accordance with a feedback or a control signal. Since the position or positions of the adjustable stop are substantially linearally related to the extent of movement of the plunger, under appropriate circumstances, control may be by open loop, such as by process parameters, provided that appropriate precautions are taken to assure that such parameter controls do not exceed an acceptable stress range for the particular hydraulic adjustable stop.

It is therefore an important object of the invention to provide an accurate repeatable no backlash adjustable hydraulically-operated mechanical stop.

A further object of the invention is the provision of a precision stop in the form of a pressure vessel having at least one non-permanent elastically deformable moveable wall, in which an interior volume comprises a generally incompressible liquid and is maintained under positive pressure, and in which the pressure is adjustable by the movement within the pressure vessel of a moveable stop member or plunger or by loads applied to the deformable walls.

The invention has, as its objective and feature, high resolution for linear adjustment permitting, in the preferred embodiment, control to within 0.0001 inches of adjustment. The apparatus is characterized by high load capacity with relatively low internal hydraulic pressures which can easily be handled by conventional o-ring-type seals. The apparatus is further characterized by a simplicity of components, making the same easy to manufacture and to assemble.

These and other objects and advantages of the invention will be apparent from the following description, the accompanying drawings and the appended claims.

DESCRIPTION OF PREFERRED EMBODIMENTS

Figure 1:
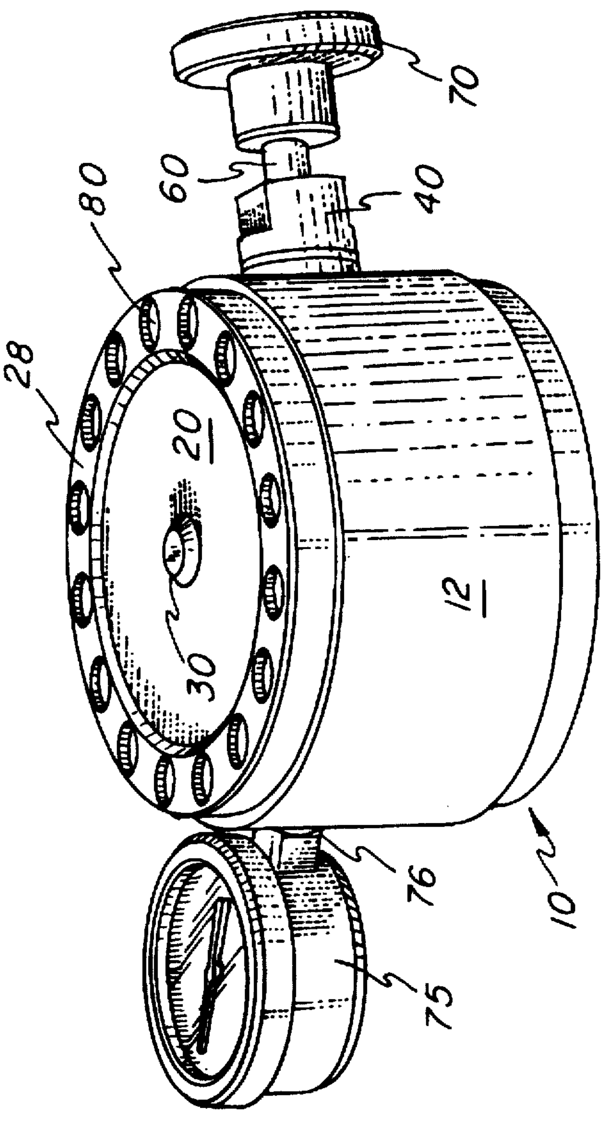
FIG. 1 is a perspective view of a precision hydraulic adjustable stop made in accordance with this invention.
Figure 2:
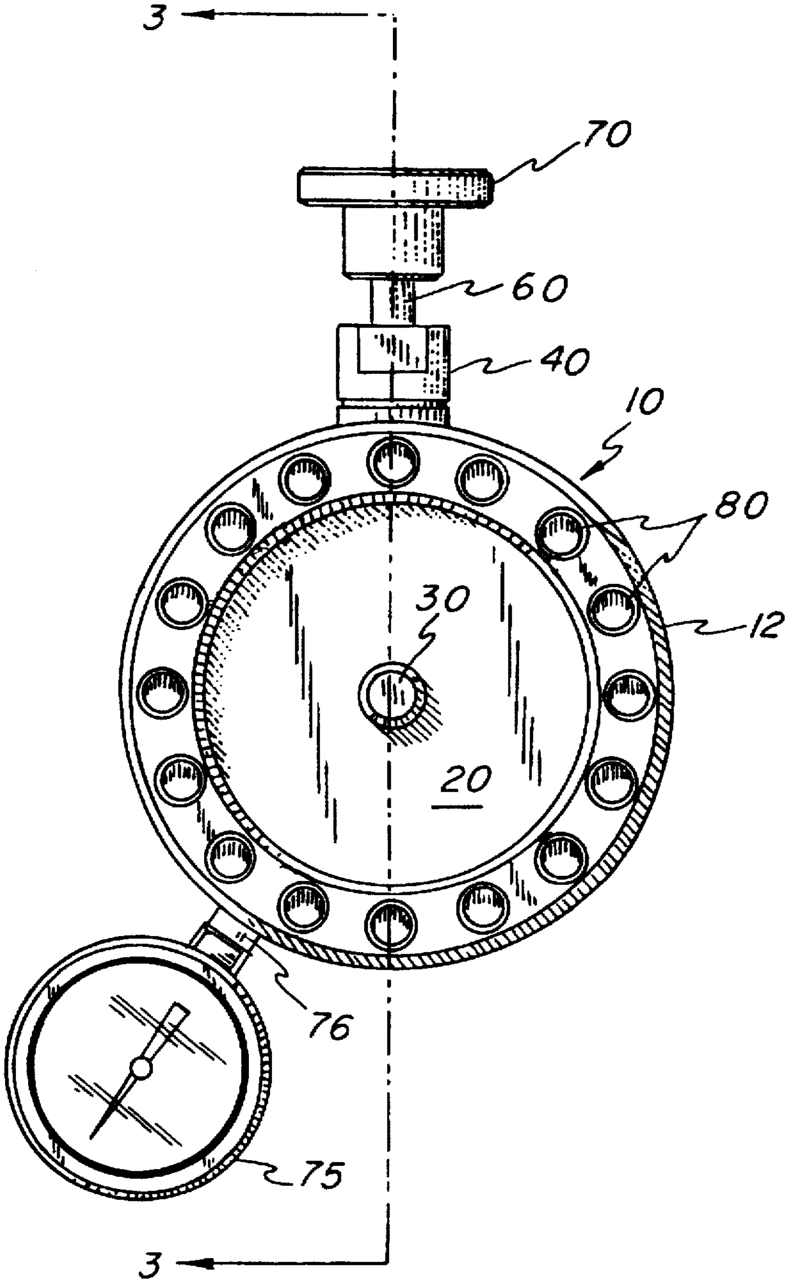
FIG. 2 is an end view of the stop of FIG. 1.

Referring to the figures of the drawings, which represent preferred embodiments of the invention, a precision hydraulic adjustable stop in accordance with this invention is illustrated generally at 10 in FIGS. 1 and 2. In this embodiment of the invention, the stop 10 comprises a rigid body 12 in the general form of an annulus, also referred herein as annular body 12. The body 12 defines an internal cavity 15 which has a pair of opposed open faces, namely an open face 16 on one lateral side and a diametrically opposed open face 17 on the opposite lateral side.

Each of the open faces 16 and 17 is closed by an elastically deformable, semi-flexible liquid impervious disc-shaped wall or plate 20 and 21. The plate 20 closes the cavity 15 at the face 16, while the plate 21 closes the cavity 15 at the face 17, so that the plates 20 and 21 are mounted in opposed relation to each other on the body 12.

For the purpose of this description, it is assumed that the plates 20 and 21 are identical in construction, are interchangeable, and therefore, the description herein of plate 20 may also be applied to plate 21.

The body 12 may be a pressure casting, like a high pressure valve body housing, or may be machined to form the open cavity 15. Annular locating surfaces 25 are formed in surrounding relation to the open faces 16 and 17 onto which the walls 20,21 are respectively located. The surfaces 25 are provided with annular outwardly facing grooves into which static o-ring seals 27 are placed. The O-ring seals 27 are engaged by the radially flat face of an annular ring-like portion 28 of each of the plates, designed to mate directly against the body surfaces 25.

The major portions of each of the disc-like walls or plates are formed radially flat with parallel inside and outside surfaces defining a substantially uniform thickness throughout the major extent of each of the such plates. These walls are substantially thinner and more flexible than any portion of the body 12 so that any measurable deflection of the body 12 under internal pressures is negligible compared to the pressure-induced deflection of either of the plates 20 or 21.

Each of the plates 20 and 21 has formed, on an outer surface thereof, a geometrically centrally located force or pressure pad 30. Since the plates are formed as a circular disc, in outline, as shown in FIG. 2, the pressure pads 30 are located at the geometric center. They have outer radially flat surfaces which are slightly elevated or raised in relation to the remaining portion of the respective wall to form a precision contact or pressure surface.

The body 12 is further provided with a plunger opening 32, positioned on a generally radial axis with respect to the body. The plunger opening 32 opens into the cavity 15. A displacement plunger 35 is mounted for axial movement within the opening 32, and is supported in a bonnet 40.

The bonnet 40 is threadably received and seated within an enlarged threaded opening 42, concentric with the plunger aperture 32 and is sealed with respect to a flat annular locating surface 45 between the bore 32 and opening 42, by a static o-ring 50. The plunger 35, on the other hand, is sealed to the bonnet 40 by an o-ring 52 received within the bonnet and in sealing engagement with an outer cylindrical surface of the plunger 35.

An operator stem 60 is threadably received within an outer extension 62 of the bonnet 40 and has an inner end 64 in engagement with the plunger 35. Rotation of the stem 60 in the bonnet 40, such as by the manual knob 70, or by suitable automated means is translated as an axial movement of the plunger 35 in the bore 32.

The invention further includes means for monitoring the pressure within the cavity 15 and, for the purpose of this invention, is shown in the form of a dial-type gauge 75 having its inlet stem 76 threaded into and sealed at an opening 77 leading into the interior of the body 12 at the cavity 15. Other forms of pressure transducers may be used.

Figure 3:
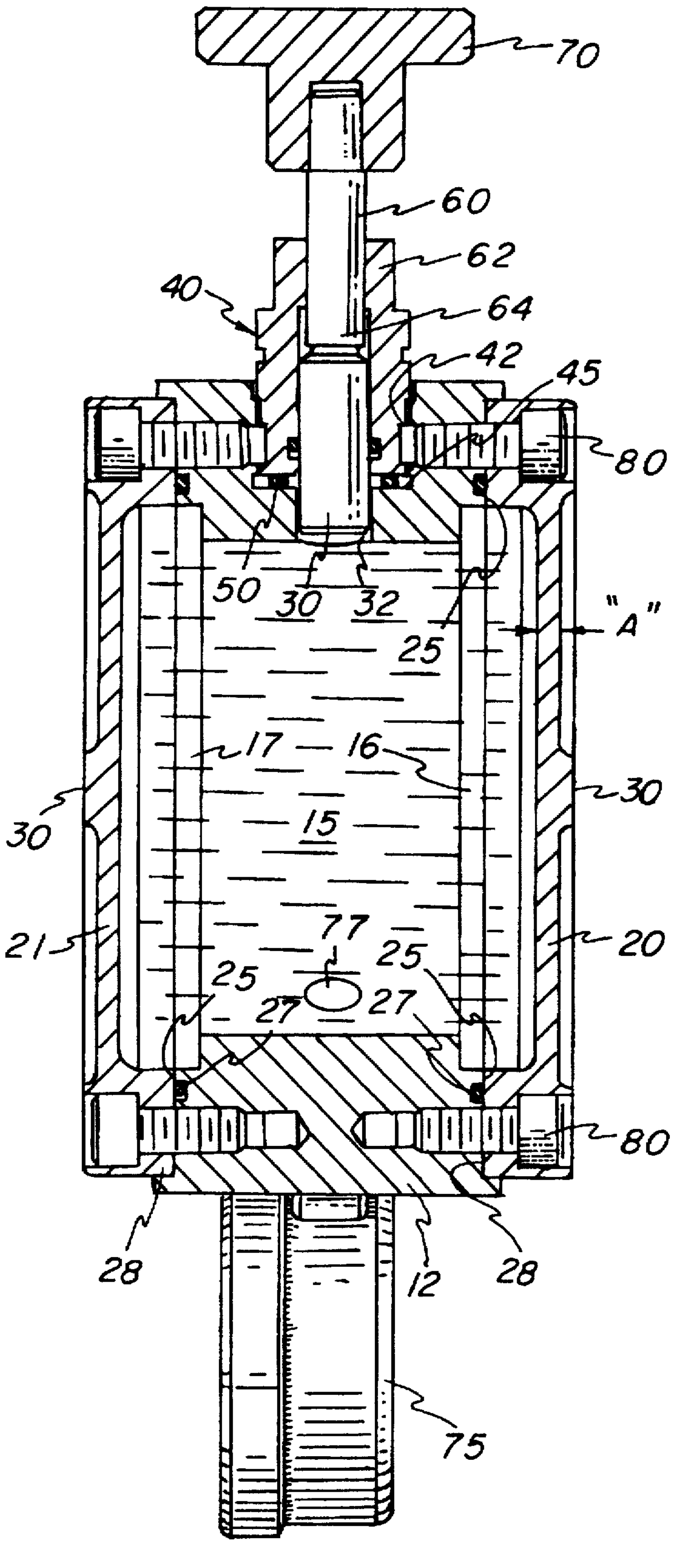
FIG. 3 is a sectional view looking generally along the line 3—3 of FIG. 2.

Each of the semi-flexible disc-shaped walls or plates 20 and 21 is mounted to the body 15 by means of cap bolts 80 formed in a bolt circle and extending into suitable threaded openings within the body 12, as illustrated by the end view in FIG. 2 and by the sectional view of FIG. 3.

The cavity 15, including all closed off openings leading thereto, is completely and totally filled, without any entrapped air, by a substantially incompressible liquid. The preferred liquid is a high bulk modulus fluid such as glycerin although, in many application, water alone or a water/antifreeze mixture is sufficient.

The walls 20 and 21 are preferably made of high strength alloy, such as AISI #4140 heat treated to a medium hardness, such as about 300 Brinell. Good results have been obtained in which the bore diameter of the cavity 15 is four inches, and in which the wall thickness "A" of the end plates 20 and 21 is 0.156 inches, and the pressure pad 30 is 0.5 inch in diameter.

In operation of the embodiment of FIG. 1–3, the cavity and all interior openings are completely filled with a liquid such as glycerol, preferably by assembling the unit while submerged in the liquid, with the plunger 35 retracted radially outwardly of the bore 32. The cap bolts 80 are threaded into the body and the bonnet 40 is likewise threaded into the body, with the resulting compression of the o-ring seals, thereby building up an initial static pressure within the cavity 15. Such an initial static pressure is desirable in that it assures that all of the seals and threads are preloaded. A pre-load pressure of 150 psig has been found to be satisfactory.

The pressure may be increased by rotating the handle 70 and stem 60, thereby depressing the plunger 35 into a fluid displacing relationship with respect to the interior cavity 15, accompanied by a slight outward flexure of the walls 20 and 21 and their respective force loading pads 30. Thus, in a position of initial loading, the loading pads may be moved relative to each other by increasing the displacement of fluid by the rotation of the stem 60. This displacement of the stop or locating surfaces may, in the example given, be as much as 0.025 of an inch with pressures increased therein up to about 550 psi.

Best results are obtained where the plates 20 and 21 are pre-loaded externally by loads which do not exceed the design load of the unit. Such initial loading provides physical support to the plates 20 and 21.

Plots of internal pressure versus pad positions demonstrate a substantially straight line function within displaceable limits between pressure increases or decreases, (as measured by turns of the stem 60 on its threads by actual pressure changes within the chamber 50) These straight line functions have no significant hysteresis loop between increasing pressure and decreasing pressure traces. In the example given, static loading as high as 900 lbs. as been applied at the pads 30 and no significant difference in slope or displacement of the plot or tracing has been seen over static loading of 650 lbs.

Two or more of the adjustable stops of this invention may be stacked, one against the other, for the purpose of extending the effective range of adjustment, which is permissible. When pressure is loaded, all of the seals and all of the threads are biased in one direction only. Therefore, the plunger 35 may be extended or retracted with respect to the cavity 15 with no backlash effects. The o-ring seal between the outer circumference of the plunger 35 and the inner circumference of the bonnet 40 is subject to little wear since it is contemplated that the unit will be set at a single adjusted position over long periods of time. Perfect sealing at the internal pressures contemplated are well within the limits of conventional o-ring design.

Figure 4:
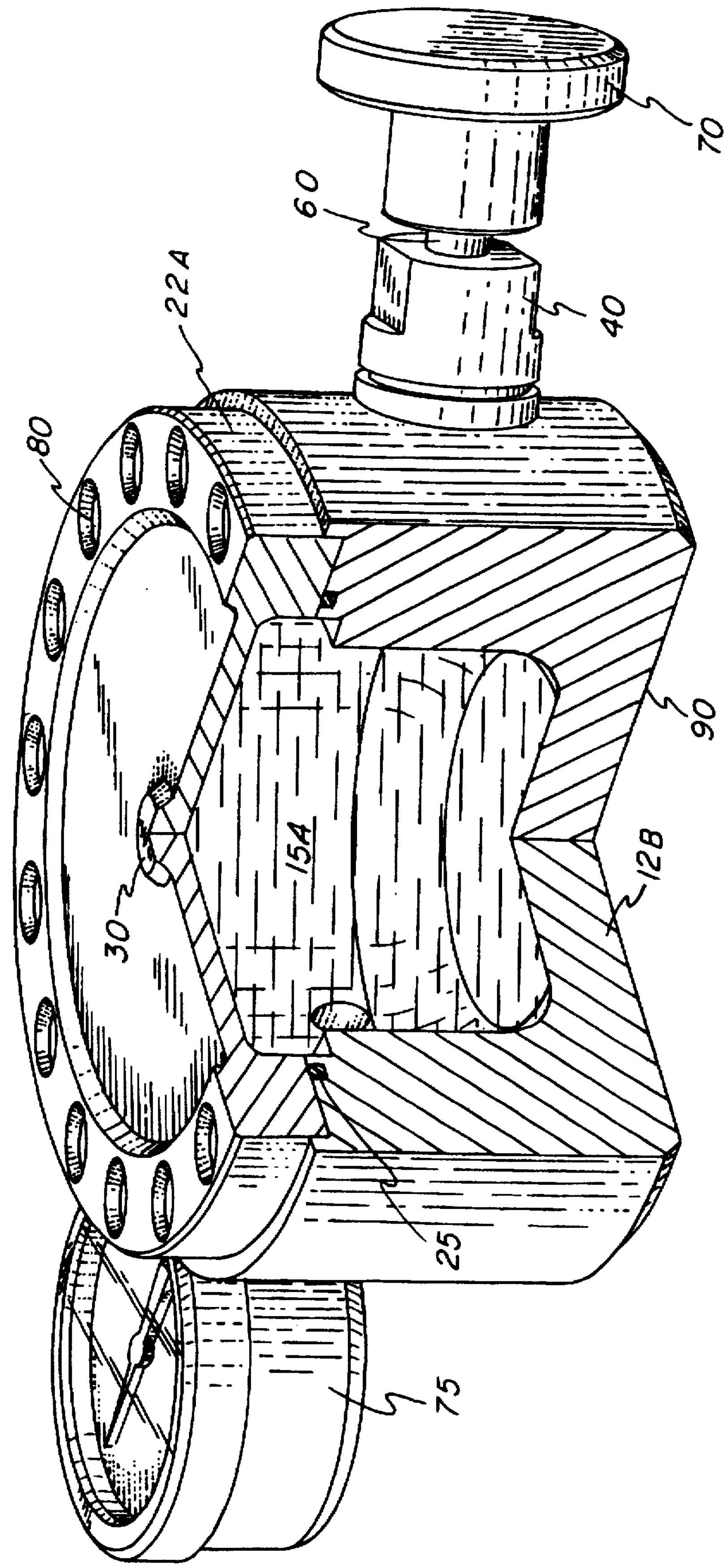
FIG. 4 is a sectional view through a modified form of the invention.

A second preferred embodiment of the invention is illustrated in the partial sectional view of FIG. 4, in which like parts are represented by like reference numerals. This embodiment is particularly adapted to provide a single elastically deformable and semi-flexible moving wall having a locating surface, in relation to a relatively rigid body. Therefore, body 12A has a generally cup-shaped internal cavity 15A which is totally closed, on one side, by an integral section 12B of the body 12A. The body 12A is formed within flat mounting surface 90.

The opposite open side is closed by a single plate or wall 20A which, for the purposes of this description, may be considered to be identical to the construction of the wall 20 previously described in connection with the embodiments of FIGS. 1–3. Further, the remaining components of the invention as previously described, remain unchanged and are labeled in FIG. 4 with the same reference numerals which have been applied to the corresponding components in FIGS. 1–3.

The wall 20A and the locating surface 30, will be deflected twice the extent of the deflections of the walls 20 and 21, assuming no change has been made in the pitch of the threads supporting the operator stem 60 or in the size or displacement of the plunger 35.

As previously mentioned, the apparatus of this invention is particularly adapted for use in an automatic control system, in which the position or positions of the surface or surfaces 30 is controlled by an automated control of the position of the plunger 35. This automated control may take the place of the handle 20, with a direct driving connection to the stem 60 such as by a suitable controllable actuator connected to the stem. Such an actuator may, in a closed loop control system, be responsive to a strain feedback signal or, in appropriate cases, may be made responsive to process parameters. Position feedback from the servo itself, or from an LVDT, could be used in appropriate circumstances, in accordance with well known process control technology. The lack of backlash in the adjustable stop provides a mechanism which is repeatable, in an automatic control system, with high accuracy.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A repeatable no backlash adjustable stop, comprising a rigid enclosed body defining a cavity having an open face, an elastically deformable liquid impervious semi-flexible metal plate mounted on said body in closing relation to said cavity open face, a precision locating pad located on an outer surface of said plate, a liquid displacement member on said body and moveable into fluid-displacing relation to said cavity, a seal between said member and said body for sealing said member with respect to said body, a relatively incompressible liquid filling said cavity under a positive pre-load static pressure head, said member being movable on said body relative to said cavity for displacing variable portions of said liquid, said plate being bendable by elastic deformation by said displacement of said liquid by said member in said cavity whereby said locating pad may be accurately positioned through such elastic deflection in relation to said body.

2. The stop of claim 1 in which said liquid is glycerol.

3. The stop of claim 1 in which said member is a plunger, said plunger being mounted in said body for reciprocal movement with respect to said cavity.

4. The stop of claim 1 in which said pad is positioned at a geometric center of said plate.

5. A repeatable no backlash adjustable stop, comprising a rigid annular body defining a cavity having a circular open face, an elastically deformable liquid impervious circular plate formed of a semi-flexible metal and mounted on said body in closing relation to said cavity open face, said plate having, on an outer surface thereof, a locating pad positioned generally geometrically centrally of said plate, a plunger mounted on said body and moveable through a plunger aperture on said body into fluid-displacing relation to said cavity, a seal formed between said plunger and said body for sealing said plunger with respect to said body, said plunger being moveable on said body relative to said cavity for displacing variable portions of said cavity volume, a relatively incompressible liquid filling said cavity under a condition of a positive pre-load of static pressure, said plate being bendable by elastic deformation by displacement of said liquid by said plunger whereby said locating pad may be accurately positioned through such elastic deflection in relation to said body.

6. A repeatable no backlash adjustable stop comprising an annular rigid body defining therein a cavity, a pair of elastically deformable metal end plates mounted in opposed relation on said body and in closing said cavity, a plunger in said body thereof selectively extendable for displacing a portion of the volume of said cavity, each of said end plates having a force locating pad on an exterior surface thereof, a substantially incompressible liquid filling said cavity and under a pre-load static pressure head, said plunger being moveable on said body to displace a portion of said liquid accompanied by limited elastic deformations of each of said end plates for adjusting the spaced apart distance between said locating pads.

7. The stop of claim 6 in which said liquid is maintained under a static head of pressure.

8. The stop of claim 6 in which said liquid has a high bulk modulus.

9. The stop of claim 8 in which said liquid is glycerol.

10. A repeatable no backlash adjustable stop comprising a rigid body defining therein a cavity, said cavity opening on said body at two diametrically opposed faces, a pair of semi-flexible metal end plates mounted in opposed relation on said body and in closing said cavity at said faces, a plunger in said body rotatably threadably mounted with a portion thereof selectively extendable into said cavity for displacing a portion of the volume of said cavity, each of said end plates having a force a locating pad positioned generally geometrically central of the associated said end plate and on an exterior surface thereof, a substantially incompressible fluid filling said cavity and under a pre-load static pressure head, said plunger being moveable on said body by rotation to displace a portion of said fluid accompanied by limited elastic deflections of said end plates for adjusting the spaced apart distances of said force locating pads.

11. A repeatable no backlash adjustable stop comprising an annular rigid body defining therein a cavity, a pair of elastically deformable metal end plates mounted in opposed relation on said body and in closing relation to said cavity, said end plates having a uniform thickness over a substantial portion thereof, a plunger in said body thereof selectively extendable for displacing a portion of the volume of said cavity, each of said end plates having a force locating pad on an exterior surface thereof, a substantially incompressible high bulk modulus liquid filling said cavity, said plunger being moveable on said body to displace a portion of said liquid accompanied by limited elastic deformations of each of said end plates for adjusting the spaced apart distance between said locating pads.

* * * * *